US009782710B2

(12) United States Patent
Jain et al.

(10) Patent No.: US 9,782,710 B2
(45) Date of Patent: Oct. 10, 2017

(54) MULTI-SIDED VENTILATION ASSEMBLY FOR WIND TURBINE TOWER ACCESS DOOR

(71) Applicant: General Electric Company, Schenectady, NY (US)

(72) Inventors: Pritesh Jain, Bangalore (IN); Vijendra Singh Chauhan, Bangalore (IN); Darren John Danielsen, Glenville, NY (US); Roman Kolar, Hendersonville, NC (US); Danian Zheng, Simpsonville, SC (US); Jay F. Leonard, Greenville, SC (US); Brian Keith Andreson, Albany, NY (US); Adam Lord, Troy, NY (US)

(73) Assignee: General Electric Company, Schenectady, NY (US)

(*) Notice: Subject to any disclaimer, the term of this patent is extended or adjusted under 35 U.S.C. 154(b) by 78 days.

(21) Appl. No.: 14/788,935

(22) Filed: Jul. 1, 2015

(65) Prior Publication Data
US 2017/0009746 A1    Jan. 12, 2017

(51) Int. Cl.
| | |
|---|---|
| *F03D 13/20* | (2016.01) |
| *F03D 9/00* | (2016.01) |
| *B01D 46/00* | (2006.01) |
| *E06B 7/04* | (2006.01) |
| *F03D 80/00* | (2016.01) |
| *E06B 7/02* | (2006.01) |
| *E06B 7/084* | (2006.01) |

(52) U.S. Cl.
CPC ............ *B01D 46/0023* (2013.01); *E06B 7/02* (2013.01); *E06B 7/04* (2013.01); *E06B 7/084* (2013.01); *F03D 80/00* (2016.05); *F05B 2260/64* (2013.01)

(58) Field of Classification Search
CPC ............ F03D 13/20; F03D 9/062; F03D 9/00; F03D 9/002; F05B 2240/40; F05B 2240/912; Y02E 10/728
USPC ............................................ 55/385.1; 290/55
See application file for complete search history.

(56) References Cited

U.S. PATENT DOCUMENTS

| | | | |
|---|---|---|---|
| 8,171,674 B2 | 5/2012 | Bagepalli et al. | |
| 8,227,932 B2 | 7/2012 | Murata et al. | |
| 2010/0308596 A1 | 12/2010 | Gawrisch et al. | |
| 2013/0009405 A1* | 1/2013 | Sato ........................ | F03D 13/20 290/55 |
| 2014/0361544 A1* | 12/2014 | Reed ........................ | F03D 13/20 290/55 |

* cited by examiner

*Primary Examiner* — Jacob T Minskey
*Assistant Examiner* — Minh-Chau Pham
(74) *Attorney, Agent, or Firm* — Dority & Manning, P.A.

(57) ABSTRACT

A wind turbine tower includes a door access opening in a down tower area of the tower. A hinged door panel covers the door access opening, with a ventilation opening defined through the door panel. A multi-sided intake structure, such as a box-like structure, is connected to an exterior of the door panel over the first ventilation opening. The intake structure extends transversely from the door panel and includes a top side, a bottom side, and at least two vertical sides extending between the top side and the bottom side. The vertical sides are open to air flow therethrough. The top and bottom sides may also be open to air flow therethrough. Air from multiple directions is drawn into an interior of the wind turbine tower through the intake structure and ventilation opening. A filtering system with first and second stage filters may be incorporated with any of the intake structures.

20 Claims, 9 Drawing Sheets

MULTI-SIDED VENTILATION ASSEMBLY FOR WIND TURBINE TOWER ACCESS DOOR

FIELD OF THE INVENTION

The present invention relates generally to the field of wind turbines, and more particularly to a louver assembly for incorporation with a door in a wind turbine tower.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The tower of a wind turbine is typically constructed from a plurality of tower cans or segments. Each tower segment generally comprises a steel plate that has been rolled and welded at the ends to form a circular shape. The circular shaped tower segments may then be stacked one on top of the other to form a hollow tower structure. Additionally, to provide access to the interior of the hollow tower structure, a door is typically formed in one or more of the lower tower segments.

A number of the control components and cabinets (e.g., converter panels) are generally housed in the turbine down tower area. These components generate a significant amount of heat, and it has been the conventional practice to provide a louver and filter in the tower door to introduce fresh air into this down tower area. A problem exists, however, in that the louvers have a limited cross-sectional area to the flow of air and the filters become quickly clogged (particularly in environments with heavy air particulate concentrations, such as a desert of other sandy location) and block the flow of fresh air.

U.S. Pat. Publication No. 2010/0308596 describes a wind tower door assembly wherein one or more air passage openings are provided above and below the door opening, which is framed by a door frame. An air conduit within the tower is connected to the air passage opening and includes a ventilator fan for drawing air into the tower through the opening and conduit. An air discharge passage is located in the tower wall opposite from the air passage openings.

U.S. Pat. No. 8,227,932 discloses a wind tower structure wherein a concave space is defined in the tower at the location of the tower door by a partition wall disposed around the door opening. A heat exchanger is disposed in the lower portion of the concave space and circulates a cooling medium flow to components within the tower. An outside air-circulation path is established within the concave space whereby outside air is drawn through the heat exchanger, rises in the concave space, and is discharged into the atmosphere in an upper portion of the concave space.

U.S. Pat. Publication No. 2013/00009405 describes a wind tower structure wherein a tower opening is provided for introducing air into the tower. A cylindrical portion extends from the tower opening into the tower. All or a portion of the peripheral surface of the cylindrical portion includes pressure loss elements, such as louvers, for delivery of the outside air.

The above systems are relatively complicated in that they require air handling equipment and/or substantial modifications to a generally tubular tower segment that defines the down tower area incorporating the tower door, and would be relatively expensive and prohibitive as retrofit systems. Accordingly, the industry would benefit from an improved system for introducing fresh air to the down tower area of a wind turbine tower that is relatively inexpensive and easily retrofitted to existing tower structures.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine tower includes a door access opening in a down tower area of the wind turbine tower through which access is provided for entry by personnel into the tower. A hinged door panel covers the door access opening. A first ventilation opening is defined through the door panel. In a particular embodiment, this opening is completely surrounded by the door panel. A first multi-sided intake structure is connected to an exterior of the door panel over the first ventilation opening. The intake structure extends transversely from the door panel and comprises a top side, a bottom side, and at least two vertical sides extending between the top side and the bottom side, wherein the two vertical sides are open to air flow therethrough. With this three-dimensional intake structure, air is drawn from multiple directions into an interior of the wind turbine tower through the first intake structure and first ventilation opening.

In a particular embodiment, the first intake structure is a box-like structure that includes a front side that is open to air flow therethrough and extends vertically between the top side and the bottom side and perpendicular to the vertical sides. The top side and the bottom side may also be open to air flow therethrough.

In an alternate embodiment, the first intake structure is a triangular structure wherein the two vertical sides meet at a front apex and extend vertically between the top side and the bottom side.

The sides of the intake structure are configured to allow air to be drawn through the structure. In this regard, the various sides of the structure may comprise louvered panels that can be manually or automatically opened and closed. For example, in the box-like configuration of the intake structure, the front side, vertical sides, and top and bottom sides may all be include louvered panels. In the triangular embodiment of the intake structure, only the two vertically extending sides may have louvered panels, or the top side and bottom side of the triangular structure may also include louvered panels. It should be appreciated that any combination of sides of the multi-sided intake structure may include louvered panels.

In one embodiment, the door panel includes a second ventilation opening therethrough. This second ventilation may be uncovered by an intake structure, or a second intake structure separated from the first intake structure may cover the second ventilation opening. This second intake structure may have the same three-dimensional shape and configuration as the first intake structure, or may have a different shape and configuration. For example, the first intake structure may be a box-like structure, and the second intake structure may be a triangular configuration.

In a certain embodiment, a second ventilation opening is defined through the door panel, and the first intake structure has a shape and configuration so as to cover the first and the second ventilation openings.

In yet another embodiment, the second ventilation is partially covered by a second and a third intake structure having a space therebetween so as to accommodate a railing connected to the wind turbine tower in an open state of the door panel.

In certain embodiments, the intake structure has generally the same cross-sectional size as the ventilation opening. In other words, the vertical sides and top and bottom sides of the intake structure have a length and width, respectively, that corresponds to the length and width of the sides and top and bottom of the ventilation opening. In alternate embodiments, the intake structure is over-sized with respect to the ventilation opening. For example, the length of the intake structure may be greater than the length of the ventilation opening, or the width of the intake structure may be greater than the width of the ventilation opening. In these embodiments, the intake structure may include a back that is completely open to the door panel, or a back side having an opening therein that corresponds to the size of the ventilation opening.

In other aspects, the wind turbine tower may include a filtering system incorporated with the intake structure. This system may have a first stage filter system configured with the first intake structure to filter air initially drawn into the first intake structure, and a second stage filter system configured to filter air drawn through the first stage filter prior to the air entering the interior of the wind turbine tower. The first stage filter system includes filters having a first "lower" rating to filter larger particulates, while the second stage filter system includes filters having a second "higher" rating to filter finer particulates that pass through the first filters.

In one embodiment with the filtering system, the first intake structure includes multiple sides through which air is drawn, with the first stage filter system having a first filter disposed at each of the sides through which air is draw, and the second filtering system including one or more second filters disposed within the first intake structure. For example, the second filtering system may include a single second filter disposed across the first ventilation opening.

In an alternate embodiment, the second filtering system comprises multiple second filters within the first intake structure spaced from the first ventilation opening. For example, the second filters may be disposed in a triangular configuration such that air drawn through one of the vertical sides and a portion of the front side is subsequently drawn through one of the second filters, and air drawn through the opposite vertical side and a remaining portion of the front side is subsequently drawn through a different one of the second filters.

In still another embodiment, the second filters may be disposed in a multi-triangular configuration such that air drawn through one of the vertical sides and a first portion of the front side is subsequently drawn through one of the second filters, and air drawn through the opposite vertical side and a second portion of the front side is subsequently drawn through a second one of the second filters, and air drawn through a remaining portion of the front side is subsequently drawn through a third one of the second filters.

The present invention is not limited to placement of the intake structure in the access door panel. In other embodiments, a wind turbine tower includes a first ventilation opening defined through a wall of the wind turbine tower through which air is drawn into the wind turbine tower. The opening may be at any location on the tower. A first multi-sided intake structure is connected to an exterior of the wall over the first ventilation opening. The intake structure extends transversely from the wall and includes a top side, a bottom side, and at least two vertical sides extending between the top side and the bottom side, wherein the vertical sides are open to air flow therethrough, wherein air is drawn from multiple directions into an interior of the wind turbine tower through the first intake structure and first ventilation opening.

Any of the other features discussed above and descried in greater detail below may be incorporated with the embodiments wherein the ventilation opening is in the wall of the wind turbine tower.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Figure 1:
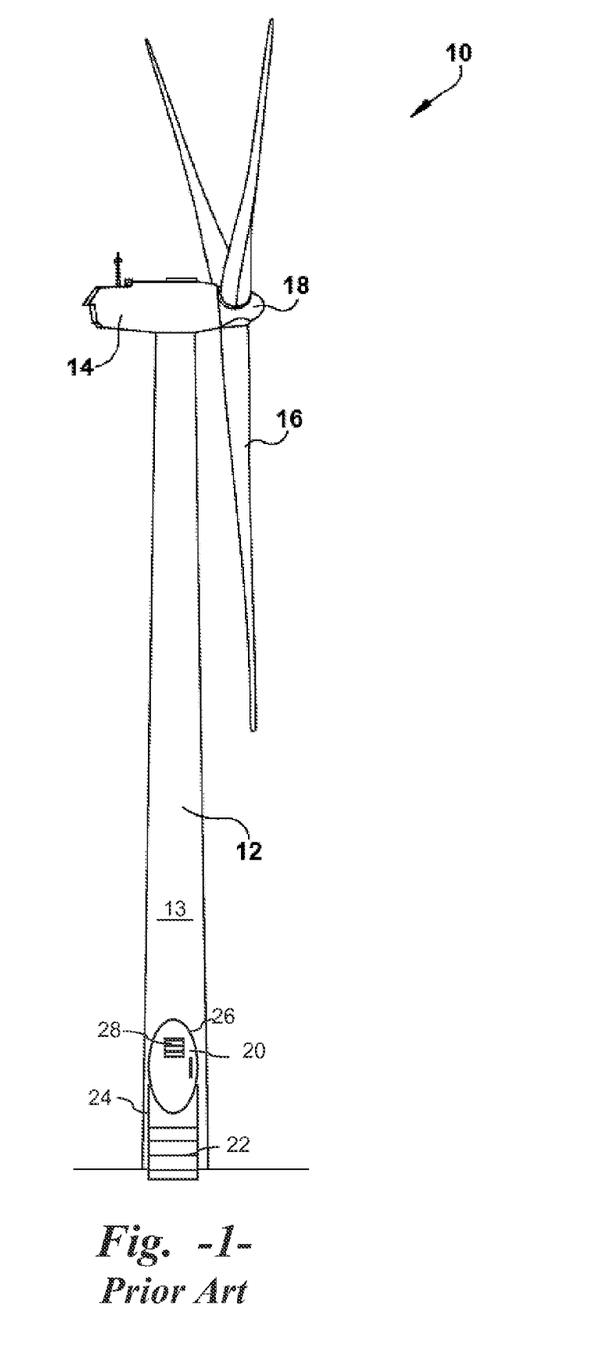
FIG. 1 is a perspective view of a conventional wind turbine.

FIG. 1 illustrates a wind turbine 10 of conventional construction. The wind turbine 10 includes a tower 12 with a nacelle 14 mounted thereon. The tower 12 is a generally cylindrical structure defined by a wall 13. A plurality of turbine blades 16 are mounted to a rotor hub 18, which is in turn connected to a main flange that turns a main rotor shaft. The wind turbine power generation and control components are housed within the nacelle 14. In the down tower area of the tower 12, an access door 20 is provided for maintenance personnel to gain entry into the tower 12. Stairs 22 and railings 24 are typically configured for the access door 20. A conventional construction of the access door 20 includes a ventilation opening 26 with a louvered panel 28 that is generally flush with the door panel such that only air moving in a direction towards the opening 26 is drawn into the tower 12. The view of FIG. 1 is provided for illustrative purposes only to place the present invention in an exemplary field of use. It should be appreciated that the invention is not limited to any particular type of wind turbine configuration.

Figure 2:
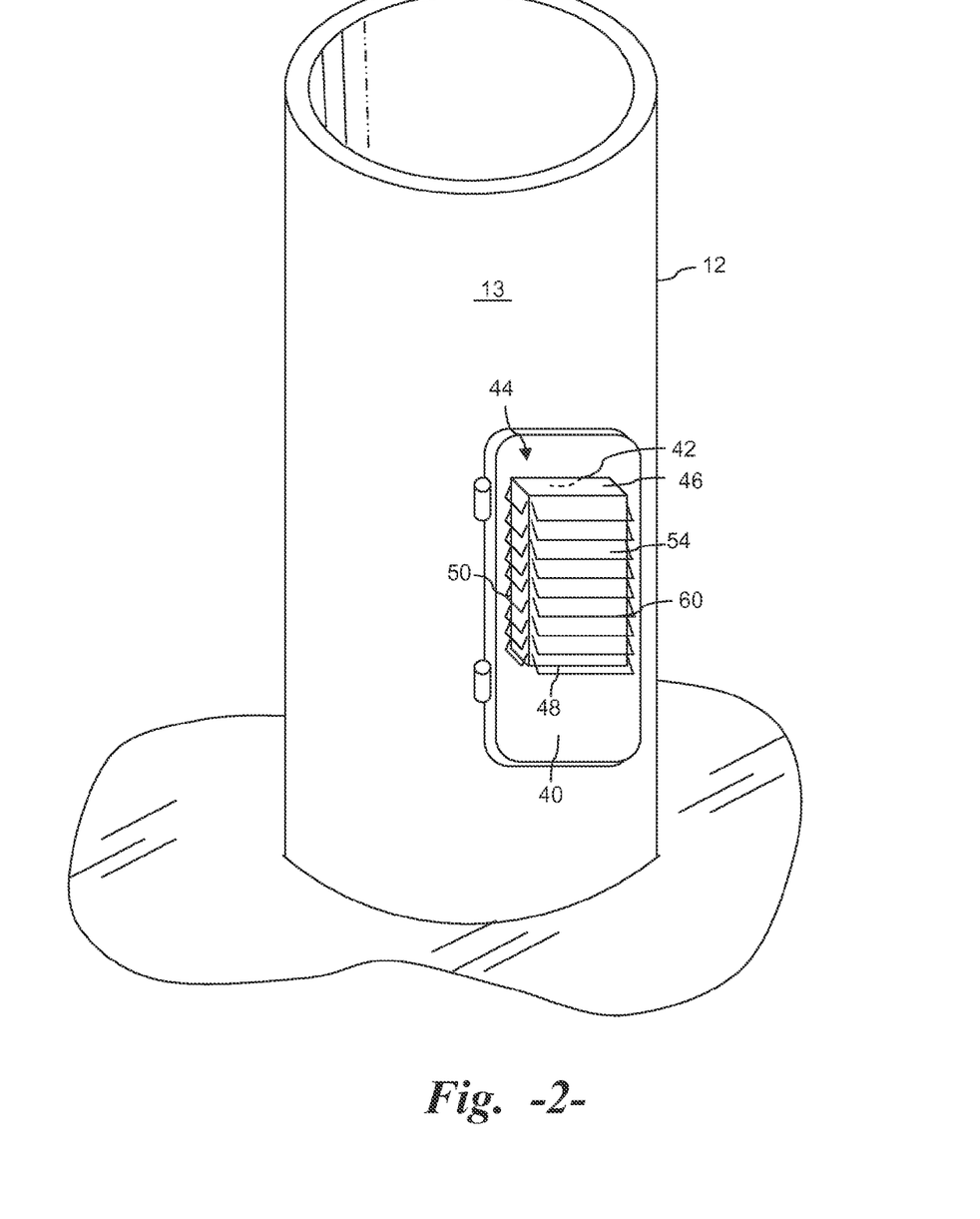
FIG. 2 is a perspective view of an embodiment of the down tower area of a wind turbine tower in accordance with aspects of the invention.

FIG. 2 illustrates a down tower area of the wind turbine tower 12 with a hinged door panel 40 covering a door access opening. A ventilation opening 42 is defined through the door panel 40 and may be completely surrounded by the door panel 40, for example in the form of an "island" within the door panel 40. In alternate embodiments, the ventilation opening 42 may be open to one of the sides of the door panel 40. The ventilation opening 42 may have any shape, such as rectangular, oval, circular, or the like.

A multi-sided intake structure 44 is connected to an exterior of the door panel 40 over the ventilation opening 42. The intake structure 44 is three-dimensional in that it includes multiple sides through which air can be drawn through the ventilation opening 42 and into the interior of the wind tower 12. In this regard, the intake structure 44 extends transversely from the door panel 40 and includes a top side 46, a bottom side 48, and at least two vertical sides 50 that extend between the top and bottom sides. At least the vertical sides 50 are open to air flow therethrough.

In certain embodiments described herein, the intake structure 44 is configured with the door panel 40. The present invention also encompasses embodiments wherein the intake structure is configured with any other ventilation opening in the tower 12, for example at a height above or below the door. The door panel embodiments described herein are for illustrative purposes only.

Figure 3:
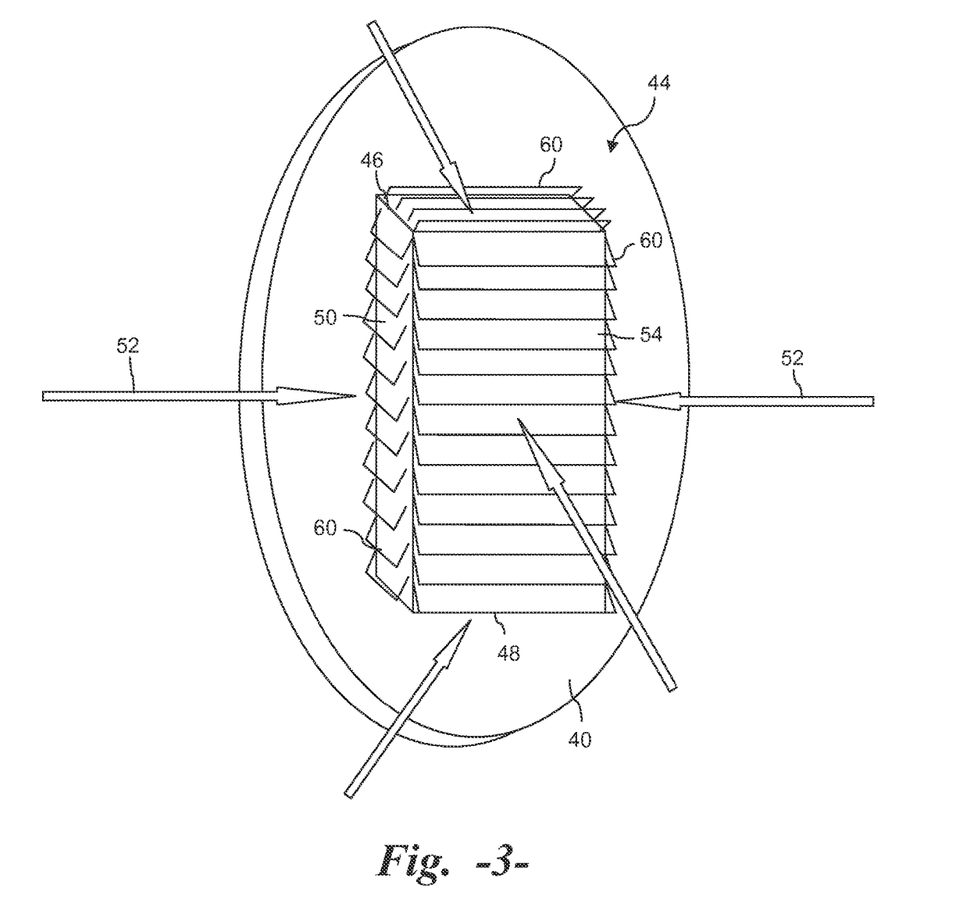
FIG. 3 is a perspective view of an exemplary intake structure on a door panel of a wind turbine tower in accordance with aspects of the invention.

In the particular embodiment illustrated, for example, in FIGS. 2 and 3, the intake structure 44 is a box-like structure that includes a front side 54 that is open to air flow therethrough and extends vertically between the top side 46 and bottom side 48, and is generally perpendicular to the two side vertical sides 50. As illustrated in FIG. 3, the top side 46 and bottom side 48 may also be open to air flow therethrough. Thus, in the embodiment of the multi-sided structure 44 depicted in FIGS. 2 and 3, air 52 (depicted by the arrows in FIG. 3) can be drawn through the intake structure 44 from essentially any direction and into the tower 12 through the ventilation opening 42.

Figure 6A:
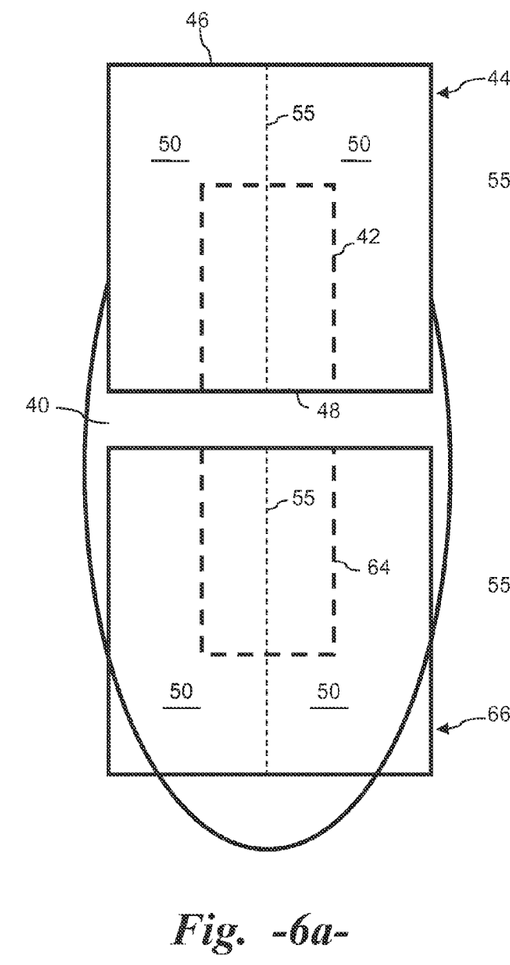
FIGS. 6a, 6b, and 6c are a front view, side view, and top view, respectively, of another embodiment of a door panel with attached intake structures.
Figure 6B:
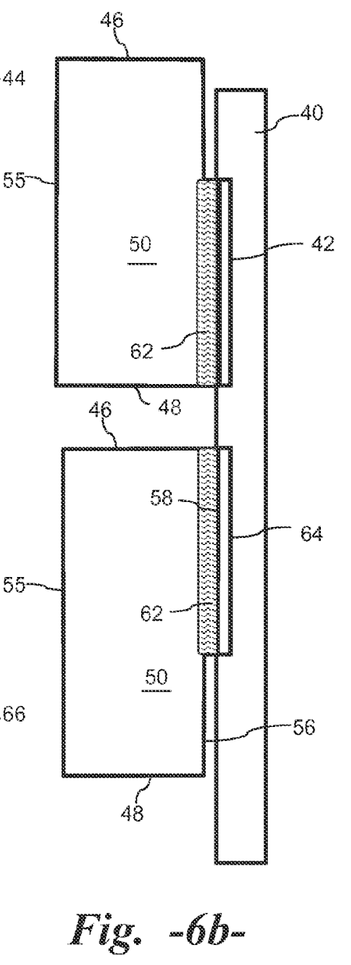
Figure 6C:
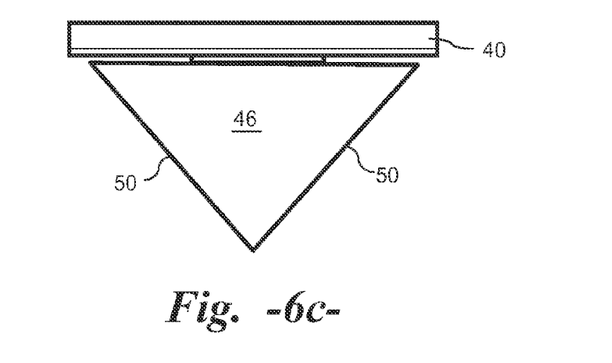

FIGS. 6A through 6C illustrate an embodiment wherein the multi-sided intake structure 44 lacks a front side and has a triangular shape wherein the vertical side panels 50 extend at an acute angle from a back side of the structure 44 and meet at an apex 55, as particularly seen in FIG. 6C.

It should thus be appreciated that the multi-sided intake structure 44 may have various multi-sided configurations within the scope and spirit of the invention.

As mentioned, the vertical sides 50, front side 54, top side 46, and bottom side 48 may all be configured to allow air to be drawn through the structure 44. In this regard, the various sides of the structure 44 may include louvered panels 60 that can be variously opened and closed to regulate the amount of air drawn through the structure 44 and also filter out or prevent sand and other particulates from being drawn into the structure 44. Various examples of commercially available louvers 60 are known and may be configured with the structure 44 in the manner described herein. In one example, the louvered panels 60 may be manually operated, as understood by those skilled in the art, or, alternatively, may be controlled automatically by a thermostat mechanism that opens and closes the panels 60 as a function of detected temperature within the wind tower 12. In the embodiment illustrated in FIG. 3, the box-like intake structure 44 includes the front side 54, vertical sides 50, top side 46, and bottom side 48 all configured with louvered panels 60. In the triangular embodiment of the intake structure 44 depicted in FIGS. 6A and 6C, it may be that only the two vertically extending sides 50 forming the triangle structure may have the louvered panels 60, or the top side 46 and bottom side 48 of the triangular structure may also include the louvered panels. It should be appreciated that any combination of sides of the multi-sided intake structure 44 may include louvered panels.

It should also be understood that louvered panels 60 are not the only mechanism by which air can be regulated through the intake structure 44. Screens or panels having openings that are variously closed by a moving back plate, for example, are also within the scope and spirit of the invention, as well as any other type of air flow regulating panel member.

Various embodiments wherein multiple intake structures are configured with the door panel 40 are also within the scope and spirit of the invention. For example, referring to the embodiment in FIGS. 4A and 4B, the first multi-sided intake structure 44 is configured over a first access opening 42 in the upper part of the door panel 40. A second intake structure 66 is configured on the door panel 40 over a second ventilation opening 64. It can be appreciated from FIGS. 4A and 4B that the intake structures 44 and 66 may be "oversized" relative to their respective ventilation openings 42 and 64. For example, referring to the first intake structure 44, the front side 54 and vertical sides 50 extend substantially above the top of the ventilation opening 42. The structure 44 includes a back side 56 and a back opening 58. The opening 58 generally corresponds in shape and size to the ventilation opening 42. Similarly, the intake structure 66 configured over the bottom ventilation opening 64 has a front side 54 and vertical sides 50 that extend substantially below the intake opening 64. The intake structure 66 includes the back side 56 with an opening 58 that generally corresponds to the shape and size of the second ventilation opening 64.

Figure 4A:
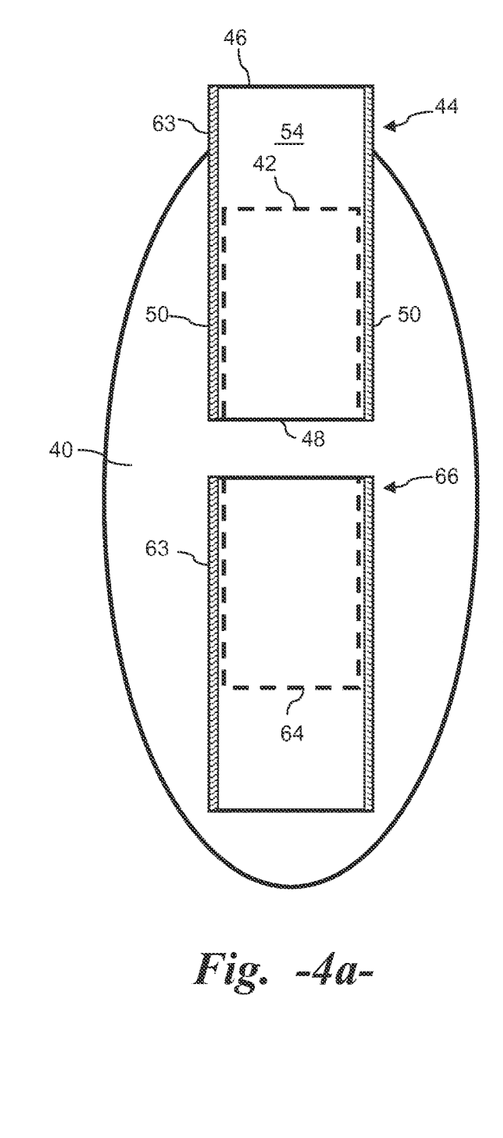
FIGS. 4a and 4b are a front view and side view, respectively, of an embodiment of a door panel with attached intake structures.
Figure 4B:
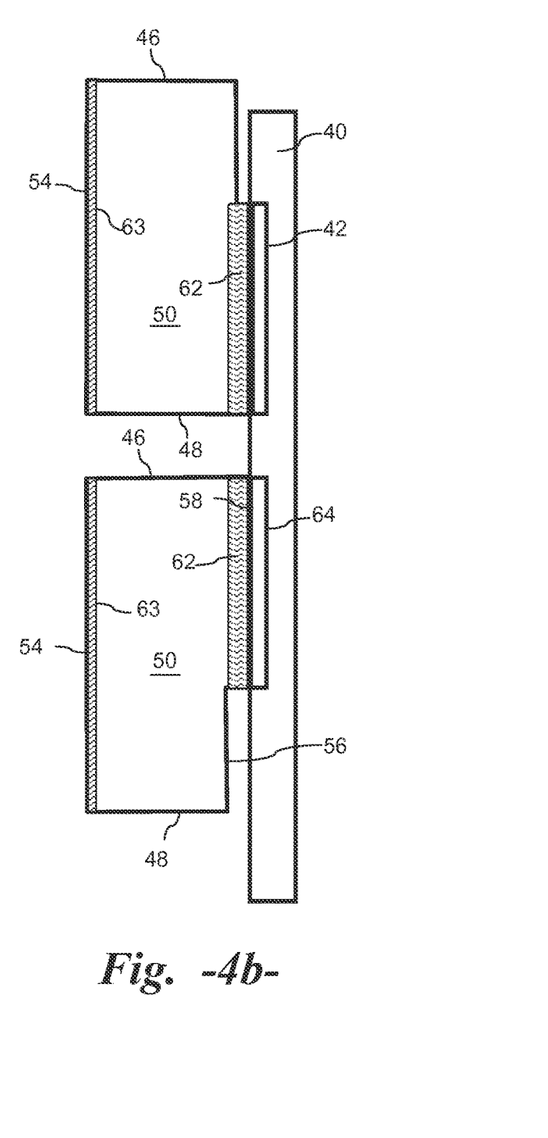

Referring to FIG. 4B, it should be appreciated that any manner of filtration material or medium may be configured with the respective ventilation openings 42, 64. These filters are generally removable and/or replaceable for cleaning, maintenance, and the like. In the embodiment of FIGS. 4A and 4B, the intake structure includes a filtering system that includes first stage filters 62 and second stage filters 63. The first stage filters 62 filter air initially drawn into the intake structure 44, and the second stage filters 63 subsequently filter the air drawn through the first stage filters 62 prior to the air entering the interior of the wind turbine tower 12. The first stage filters 62 have lower filtration rating as compared to the second stage filters 63, and are intended to filter larger particulates. The second stage filters 63 have a higher filtration rating and are intended to filter finer particulates. The filters 62, 63 are accessible through panels or doors in the intake structure 44 for cleaning or replacement. Additional embodiments of the filtering system are discussed below with reference to FIGS. 9 through 11.

Figure 5A:
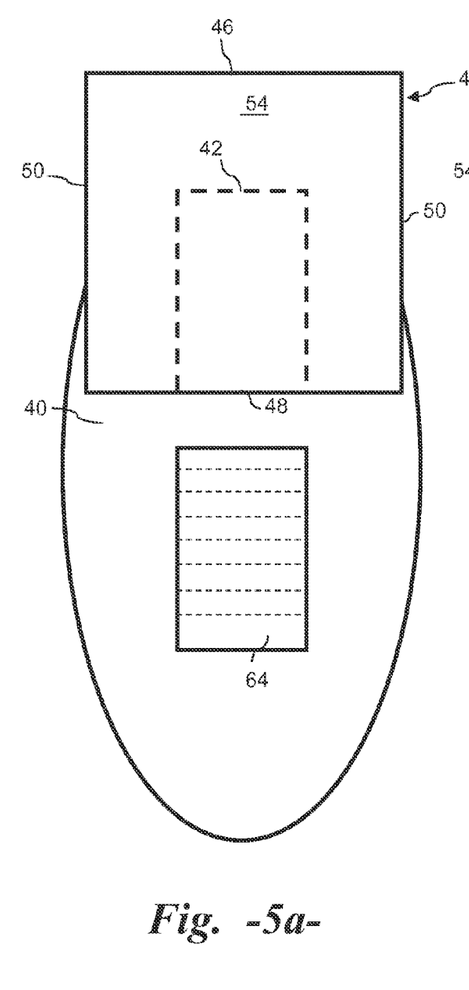
FIGS. 5a and 5b are a front view and side view, respectively, of an alternate embodiment of a door panel with attached intake structure.
Figure 5B:
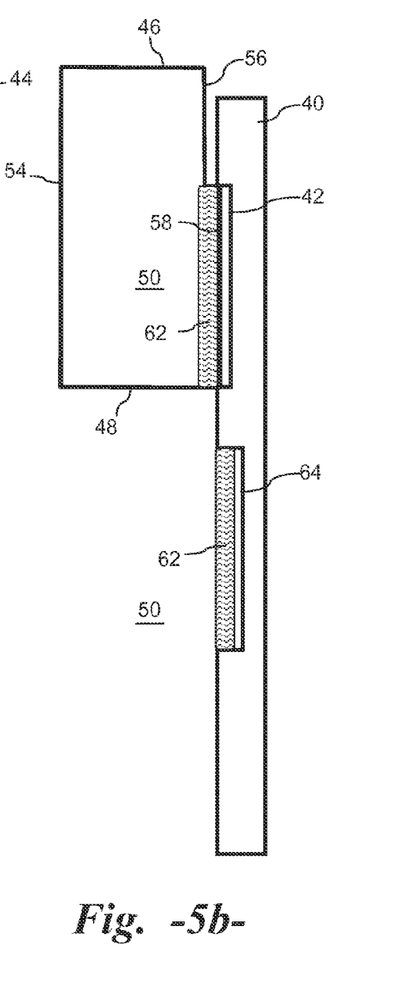

FIGS. 5A and 5B illustrate an embodiment wherein the door panel 40 includes an upper ventilation opening 42 and a lower ventilation opening 64. However, in this embodiment, only the upper ventilation opening 42 is covered by an intake structure 44, which is again over-sized relative to the ventilation opening 42 in that the front side 54 extends substantially beyond the width of the ventilation opening 42, as well as the top side 46 and bottom side 48. In addition, the vertical sides 50 extend substantially above the height of the ventilation opening 42. As depicted in FIG. 5B, the intake structure 44 includes a back side 56 with an opening 58 that corresponds generally to the shape of the intake opening 42, as discussed above with respect to FIGS. 4A and 4B. The bottom ventilation opening 64 may also include a louvered panel structure, as indicated by the dashed lines.

The triangular configuration of the intake structures 44 depicted in FIGS. 6A through 6C are discussed above. It should be noted that in this embodiment, the first intake structure 44 and second intake structure 66 are oversized relative to the ventilation openings 42 and 64, as discussed above with respect to the top intake structure 44 depicted in FIG. 5A.

Although not depicted in the figures, it should be appreciated that the various intake structures 44, 66 may have essentially the same size as their respective ventilation openings 42, 64. In this particular embodiment, the structures 44, 66 may have a completely open back side that essentially corresponds in shape and size to the ventilation opening 42, 64.

Figure 7A:
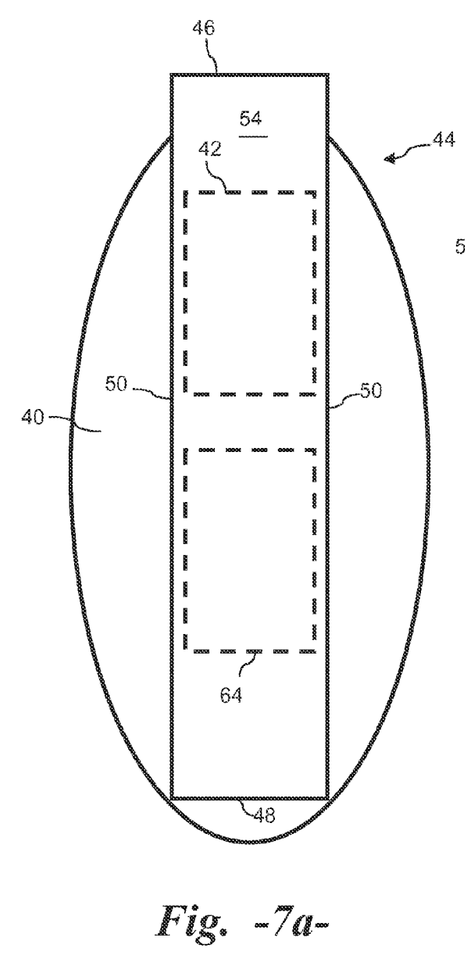
FIGS. 7a and 7b are a front view and side view, respectively, of yet another embodiment of a door panel with attached intake structures.
Figure 7B:
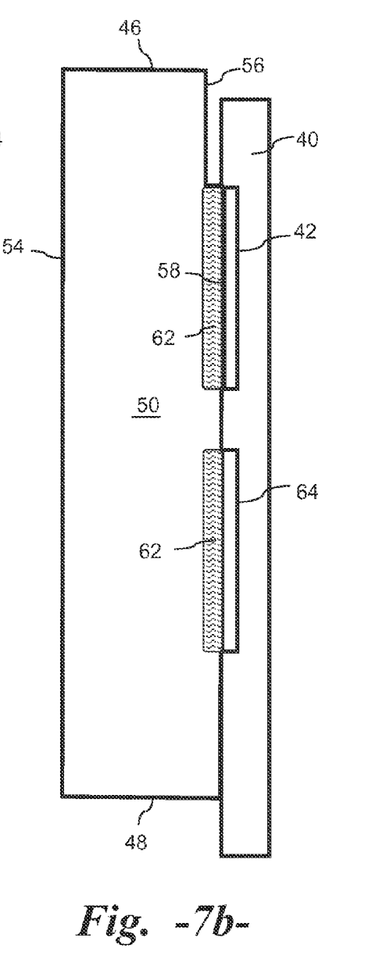

In the embodiment depicted in FIGS. 7A and 7B, a single intake structure 44 has a length and width so as to cover multiple ventilation openings 42, 64 in the door panel 40. In the illustrated embodiment, the intake structure 44 has sides 50 that extend essentially the length of the door panel 40, and may extend above the door panel 40 if provided with a back wall 56, as generally illustrated in FIG. 7B. The single intake structure 44 may include a single back opening 58 that encompasses both of the ventilation openings 42, 64. In an alternate embodiment, the intake structure 44 may have a back side 56 with multiple, separate openings 58 that mate with the ventilation openings 42, 64.

Figure 8A:
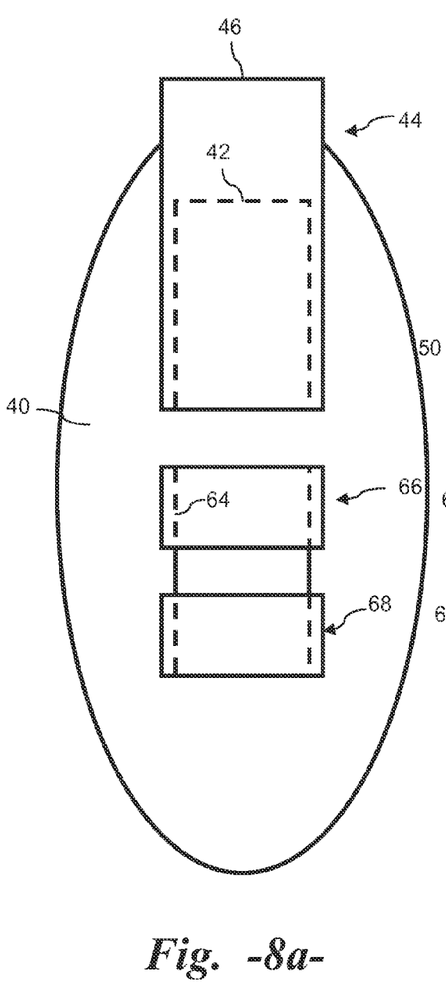
FIGS. 8a and 8b are a front view and side view, respectively, of still another embodiment of a door panel with attached intake structures.
Figure 8B:
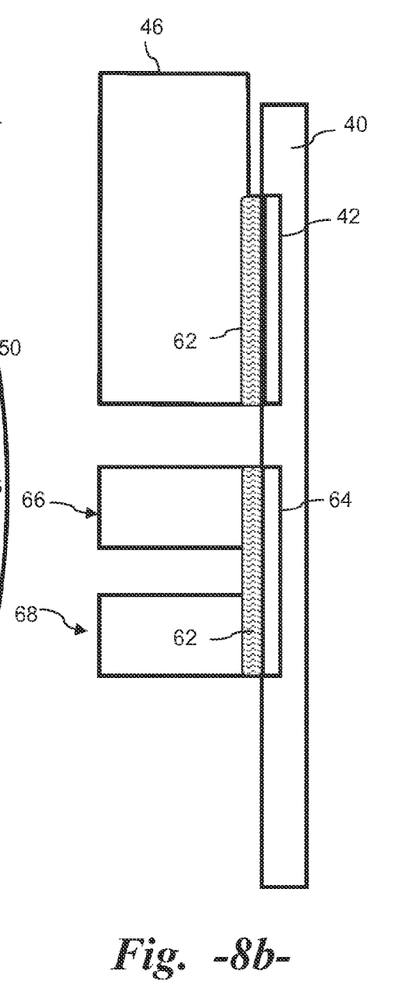

In the embodiments of FIGS. 4A, 4B, and 6A through 6C, the multiple intake structures 44, 66 have the same general shape and configuration. In other embodiments, however, multiple intake structures can have different shapes and sizes and still be configured on the same door panel 40. For example, in the embodiment of FIGS. 8A and 8B, the first intake structure 44 has a generally rectangular box-like configuration as described above with respect to FIG. 4A. The dual panel may include a lower ventilation opening 64 that is partially covered by a second intake structure 66 and a third intake structure 68 at a location such that a space is defined between the structures 66, 68. This particular embodiment may be desired in that the space will accommodate a railing 24 (FIG. 1) when the hinged door panel 40 is in the completely open position. The space between the structures 66 and 68 may include a flat louvered panel such that air may flow through the space into the ventilation opening 64. In an alternate embodiment, separate ventilation openings may be assigned to each of the intake structures 66, 68.

Figure 9:
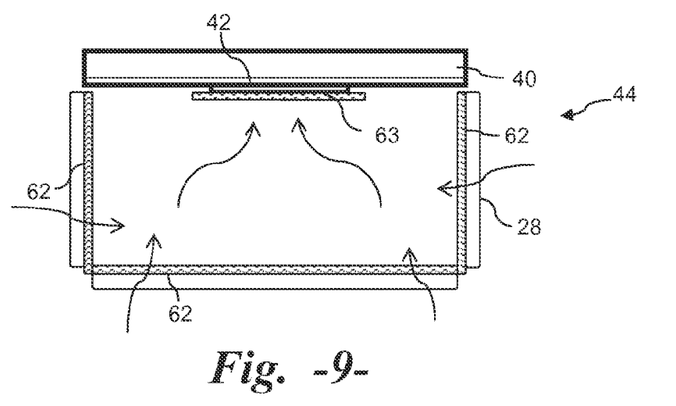
FIG. 9 is a top view of an intake structure with a first filter stage and a second filter stage incorporated therewith.

Various embodiments of a filtering system may be incorporated with any of the intake structures 44 discussed above, such as the systems depicted in FIGS. 9 through 11. The embodiment depicted in FIG. 9 is similar to that discussed above with respect to FIGS. 4A and 4B, and includes a first filter 62 having a first lower filtration rating disposed at each of the sides of the intake structure 44 through which air is draw. A single second filter 63 having a higher filtration rating is disposed within the first intake structure 44 across the ventilation opening 42.

Figure 10:
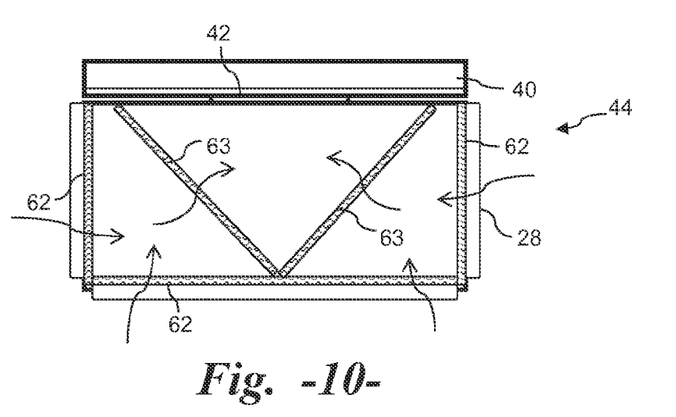
FIG. 10 is a top view of an intake structure with a different embodiment of a first and second stage filtering system.

FIG. 10 depicts that multiple second stage filters 63 can be disposed 14. The wind turbine tower as in claim 12, wherein the second filtering system comprises multiple second filters 63 within the intake structure 44 spaced from the first ventilation opening 42. These multiple second filters 63 can be arranged in various patterns to achieve a desired pressure drop and filtering efficiency. In FIG. 10, the second filters 63 are disposed in a triangular configuration such that air drawn through one of the vertical sides of the intake structure 44 and a portion of the front side is subsequently drawn through one of the second filters 63. Air drawn through the opposite vertical side and a remaining portion of the front side of the intake structure 44 is subsequently drawn through a different one of the second filters 63.

Figure 11:
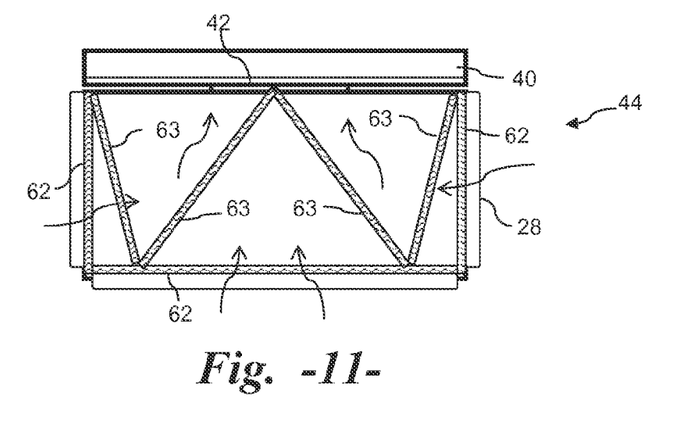
FIG. 11 is a top view of still another embodiment of an intake structure with a first and second stage filtering system.

FIG. 11 illustrates a multiple triangle configuration of the second filters 63 wherein air drawn through one of the vertical sides and a first portion of the front side of the intake structure 44 is subsequently drawn through one of the second filters 63. Air drawn through the opposite vertical side and a second portion of the front side of the intake structure 44 is subsequently drawn through a second one of the second filters 63. Finally, air drawn through a remaining portion of the front side of the structure 44 is subsequently drawn through a third one of the second filters 63.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine tower, comprising:
a cylindrical tower structure;
a nacelle mounted atop the cylindrical tower structure;
a ventilation door access opening defined through the cylindrical tower structure that provides direct access into interior of the cylindrical tower structure;
a hinged door panel covering the door access opening;
a first ventilation opening defined through the door panel;
a first multi-sided intake structure configured wholly on an exterior of the door panel over the first ventilation opening;
the intake structure extending transversely from the door panel and comprising a top side, a bottom side, and at least two vertical sides extending between the top side and the bottom side, wherein the vertical sides are open to air flow therethrough; and wherein air is drawn from multiple directions directly into the interior of the cylindrical tower structure through the first intake structure and first ventilation opening.

2. The wind turbine tower as in claim 1, wherein the first intake structure is a box-like structure comprising a front side that is open to air flow therethrough and extends vertically between the top side and the bottom side and perpendicular to the vertical sides, the top and bottom sides also open to air flow therethrough.

3. The wind turbine tower as in claim 1, wherein the first intake structure is a triangular structure wherein the two vertical sides meet at a front apex and extend between the top side and the bottom side.

4. The wind turbine tower as in claim 1, wherein multiple sides of the first intake structure through which air is drawn comprise louvered panels.

5. The wind turbine tower as in claim 1, further comprising a second ventilation opening through the door panel, and a second intake structure separated from the first intake structure and covering the second ventilation opening.

6. The wind turbine tower as in claim 1, further comprising a second ventilation opening through the door panel, the first intake structure having a size and configuration so as to cover the first and the second ventilation openings.

7. The wind turbine tower as in claim 1, further comprising a second ventilation opening through the door panel, wherein the first intake structure covers the first ventilation opening, and further comprising a second and a third intake structure wholly configured on and spaced-apart on the door panel and each partially covering the second ventilation opening, wherein a space between the second and the third intake structures accommodates a railing connected to the cylindrical tower structure in an open state of the door panel.

8. The wind turbine tower as in claim 1, wherein the first intake structure is oversized relative to the first ventilation opening and has a larger cross-sectional shape and area as compared to that of the first ventilation opening, the first intake structure further comprising a back side having an opening therein with a cross-sectional size corresponding to that of the first ventilation opening.

9. The wind turbine tower as in claim 8, wherein the vertical sides of the intake structure are longer than the ventilation opening.

10. The wind turbine tower as in claim 9, wherein the top side and the bottom side of the first intake structure are wider than the first ventilation opening.

11. The wind turbine tower as in claim 1, further comprising a first stage filter system configured with the first intake structure to filter air initially drawn into the first intake structure, and a second stage filter system configured to filter air drawn through the first stage filter prior to the air entering the interior of the cylindrical tower structure.

12. The wind turbine tower as in claim 11, wherein the first intake structure includes multiple sides through which air is drawn, the first stage filter system comprising a first filter having a first rating disposed at each of the sides through which air is draw, the second filtering system comprising one or more second filters having a second rating disposed within the first intake structure.

13. The wind turbine tower as in claim 12, wherein the second filtering system comprises a second filter disposed across the first ventilation opening.

14. The wind turbine tower as in claim 12, wherein the second filtering system comprises multiple second filters within the first intake structure spaced from the first ventilation opening.

15. The wind turbine tower as in claim 14, wherein the first intake structure is a box-like structure comprising a front side extending between opposite vertical sides, the front side and vertical sides open to air flow therethrough and having a respective first filter disposed thereacross, the second filters disposed in a triangular configuration such that air drawn through one of the vertical sides and a portion of the front side is subsequently drawn through one of the second filters, and air drawn through the opposite vertical side and a remaining portion of the front side is subsequently drawn through a different one of the second filters.

16. The wind turbine tower as in claim 14, wherein the first intake structure is a box-like structure comprising a front side extending between opposite vertical sides, the front side and vertical sides open to air flow therethrough and having a respective first filter disposed thereacross, the second filters disposed in a multi-triangular configuration such that air drawn through one of the vertical sides and a first portion of the front side is subsequently drawn through one of the second filters, and air drawn through the opposite vertical side and a second portion of the front side is subsequently drawn through a second one of the second filters, and air drawn through a remaining portion of the front side is subsequently drawn through a third one of the second filters.

17. A wind turbine tower, comprising:
a cylindrical tower structure;
a nacelle mounted atop the tower structure;
a first ventilation opening defined directly through a wall of the cylindrical tower structure through which air is drawn direct into the cylindrical tower structure;
a first multi-sided intake structure configured on an exterior of the wall over the first ventilation opening;
the intake structure comprising a three-dimensional form and extending transversely from the wall and comprising a top side, a bottom side, and at least two vertical sides extending between the top side and the bottom side, wherein the vertical sides are open to air flow therethrough; and
wherein air is drawn from multiple directions directly into an interior of the wind turbine tower through the first intake structure and first ventilation opening.

18. The wind turbine tower as in claim 17, wherein the first intake structure is a box-like structure comprising a front side that is open to air flow therethrough and extends vertically between the top side and the bottom side and perpendicular to the vertical sides, the top and bottom sides also open to air flow therethrough.

19. The wind turbine tower as in claim 17, further comprising a first stage filter system configured with the first intake structure to filter air initially drawn into the first intake structure, and a second stage filter system configured to filter air drawn through the first stage filter prior to the air entering the interior of the cylindrical tower structure.

20. The wind turbine tower as in claim 19, wherein the first intake structure includes multiple sides through which air is drawn, the first stage filter system comprising a first filter having a first rating disposed at each of the sides through which air is draw, the second filtering system comprising one or more second filters having a second rating disposed within the first intake structure.

* * * * *